United States Patent
Haar et al.

[19]

[11] Patent Number: 6,138,392
[45] Date of Patent: Oct. 31, 2000

[54] ANIMAL TAG SYSTEM

[75] Inventors: Kary Haar; Jeff Hanson; Dennis Volzke, all of Aberdeen, S. Dak.

[73] Assignee: Cardinal Industries, Inc., Aberdeen, S. Dak.

[21] Appl. No.: 09/461,626

[22] Filed: Dec. 14, 1999

[51] Int. Cl.[7] .................................................. G09F 3/14
[52] U.S. Cl. ............................................. 40/301; 40/300
[58] Field of Search ................................................ 40/301

[56] References Cited

U.S. PATENT DOCUMENTS

| 3,934,368 | 1/1976 | Fearing | 40/301 |
| 5,228,224 | 7/1993 | Gardner | 40/301 |

*Primary Examiner*—Cassandra H. Davis
*Attorney, Agent, or Firm*—Michael S. Neustel

[57] ABSTRACT

An animal tag system for easily securing a tag upon an animal's ear by piercing the ear for reducing the chance of infection and removal. The tag system includes a tag member having a broad portion and a narrow portion, an extended member extending from the narrow portion, and a tip member attached orthogonally to the extended member opposite of the tag member wherein the tip member is insertable into the ear of an animal. The tip member is comprised of a shaft member having a spiked end and open end exposing a center bore within. The tip member further includes a flanged portion about the spiked end for expanding the hole pierced into the ear by the spiked end thereby allowing the extended member and the tip member to pass through in a substantially parallel position. The tip member becomes orthogonal to the extended member after insertion thereby preventing removal of the tag from the ear through the pierced opening within the ear of the animal.

8 Claims, 3 Drawing Sheets

ANIMAL TAG SYSTEM

BACKGROUND OF THE INVENTION

1. Field of the Invention

The present invention relates generally to ear tags for animals and more specifically it relates to an animal tag system for easily securing a tag upon an animal's ear by piercing the ear for reducing the chance of infection and removal.

Ear tags are a common method of identifying cattle and other types of livestock. Ear tags are typically designed with a flat portion for receiving an indicia along with an extended member with a flanged portion attached to the distal end thereof.

The main problem with conventional ear tag devices is that they require the user to cut a slit within the animal's ear that is easily infected under the wrong conditions. Hence, there is a need for a tag system that does not require cutting a slit within the animal's ear and that limits the damage to the animal's ear during insertion of the tag.

2. Description of the Prior Art

Conventional ear tags have been in use for years. Typically, conventional ear tags are typically designed with a flat portion for receiving an indicia along with an extended member with a flanged portion attached to the distal end thereof. To attach the conventional ear tag to the ear of the animal, the user must first utilize a knife or other sharp object to cut a slit within the ear. The user then spreads the slit apart and inserts the extended member with the flanged portion through and then allows the slit to close upon the extended member thereby retaining the ear tag within the ear of the animal.

The main problem with conventional ear tag devices is the chances of the ear becoming infected from the slit in the ear. The knife may be contaminated causing the infection or the exposed slit within the ear may become infected through exposure to bacteria in the animal's environment. Another problem with conventional ear tag devices is that they are difficult and time consuming to attach to an ear of an animal.

While these devices may be suitable for the particular purpose to which they address, they are not as suitable for easily securing a tag upon an animal's ear by piercing the ear for reducing the chance of infection and removal. Conventional ear tag devices cause significant damage to the ear of the animal during attachment thereby increasing the likelihood of infection. Conventional ear tag devices are also time consuming to attach to an ear of the animal and can be dangerous for the user handling the knife.

In these respects, the animal tag system according to the present invention substantially departs from the conventional concepts and designs of the prior art, and in so doing provides an apparatus primarily developed for the purpose of easily securing a tag upon an animal's ear by piercing the ear for reducing the chance of infection and removal.

SUMMARY OF THE INVENTION

In view of the foregoing disadvantages inherent in the known types of ear tag devices now present in the prior art, the present invention provides a new animal tag system construction wherein the same can be utilized for easily securing a tag upon an animal's ear by piercing the ear for reducing the chance of infection and removal.

The general purpose of the present invention, which will be described subsequently in greater detail, is to provide a new animal tag system that has many of the advantages of the ear tag devices mentioned heretofore and many novel features that result in a new animal tag system which is not anticipated, rendered obvious, suggested, or even implied by any of the prior art ear tag devices, either alone or in any combination thereof.

To attain this, the present invention generally comprises a tag member having a broad portion and a narrow portion, an extended member extending from the narrow portion, and a tip member attached orthogonally to the extended member opposite of the tag member wherein the tip member is insertable into the ear of an animal. The tip member is comprised of a shaft member having a spiked end and open end exposing a center bore within. The tip member further includes a flanged portion about the spiked end for expanding the hole pierced into the ear by the spiked end thereby allowing the extended member and the tip member to pass through in a substantially parallel position. The tip member becomes orthogonal to the extended member after insertion thereby preventing removal of the present invention from the ear through the pierced opening within the ear of the animal.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal tag system that will overcome the shortcomings of the prior art devices.

An object is to provide an animal tag system for easily securing a tag upon an animal's ear by piercing the ear for reducing the chance of infection and removal.

Another object is to provide an animal tag system that reduces the likelihood of infection within an ear of an animal.

An additional object is to provide an animal tag system that significantly reduces the time required to attach an ear tag to an animal.

A further object is to provide an animal tag system that is difficult to remove from the ear of the animal.

Another object is to provide an animal tag system that is safe to the user to utilize without fear of cutting themselves.

A further object is to provide an animal tag system that allows increased accuracy of placement within the ear of the animal.

Another object is to provide an animal tag system that does not tear, slice or cut an opening within the ear of the animal.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
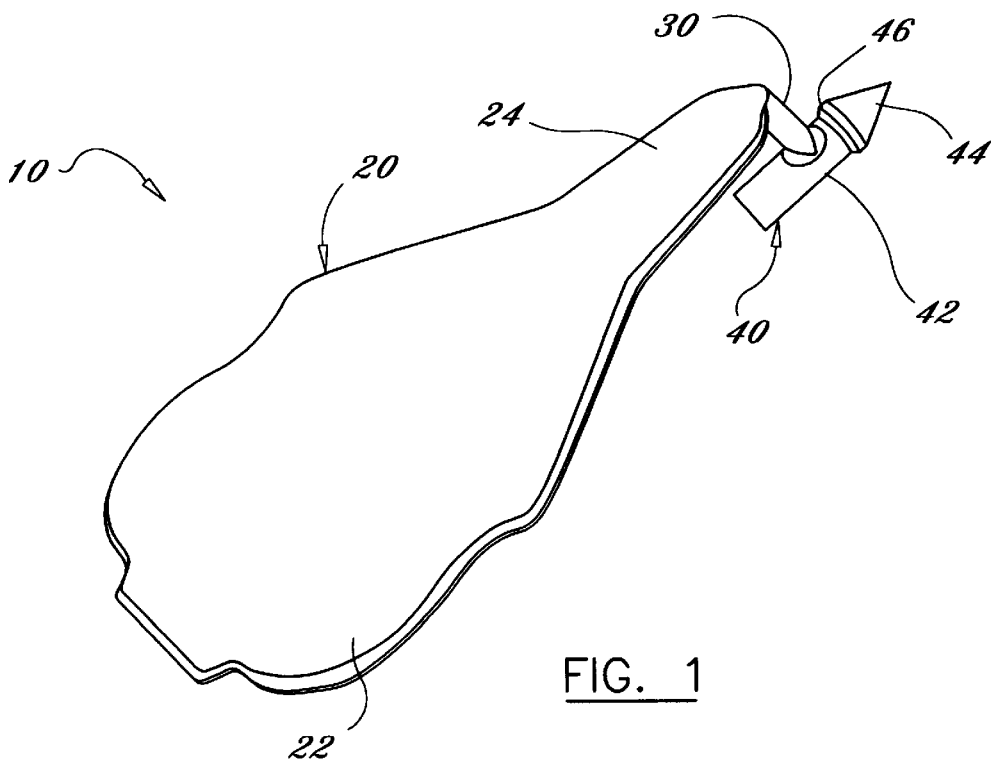
FIG. 1 is an upper perspective view of the present invention.

Turning now descriptively to the drawings, in which similar reference characters denote similar elements throughout the several views, FIGS. 1 through 6 illustrate an animal tag system 10, which comprises a tag member 20 having a broad portion 22 and a narrow portion 24, an extended member 30 extending from the narrow portion 24, and a tip member 40 attached orthogonally to the extended member 30 opposite of the tag member 20 wherein the tip member 40 is insertable into the ear 14 of an animal. The tip member 40 is comprised of a shaft member 42 having a spiked end 44 and open end exposing a center bore 48 within. The tip member 40 further includes a flanged portion 46 about the spiked end 44 for expanding the hole pierced into the ear 14 by the spiked end 44 thereby allowing the extended member 30 and the tip member 40 to pass through in a substantially parallel position. The tip member 40 becomes orthogonal to the extended member 30 after insertion thereby preventing removal of the present invention from the ear 14 through the pierced opening within the ear 14 of the animal.

Figure 2:
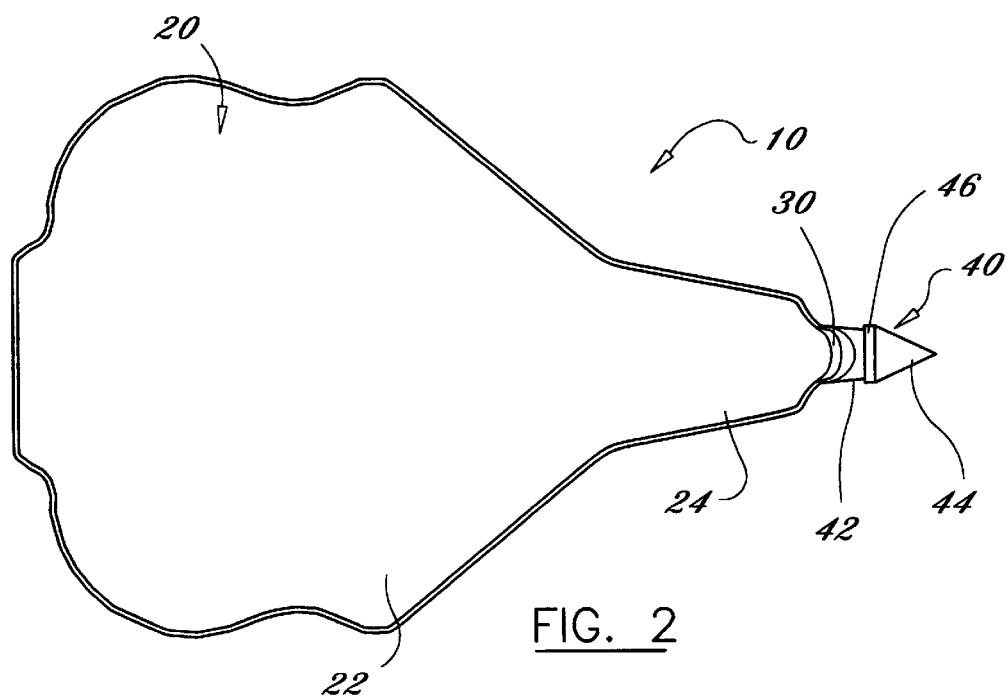
FIG. 2 is a top view of the present invention.
Figure 3:
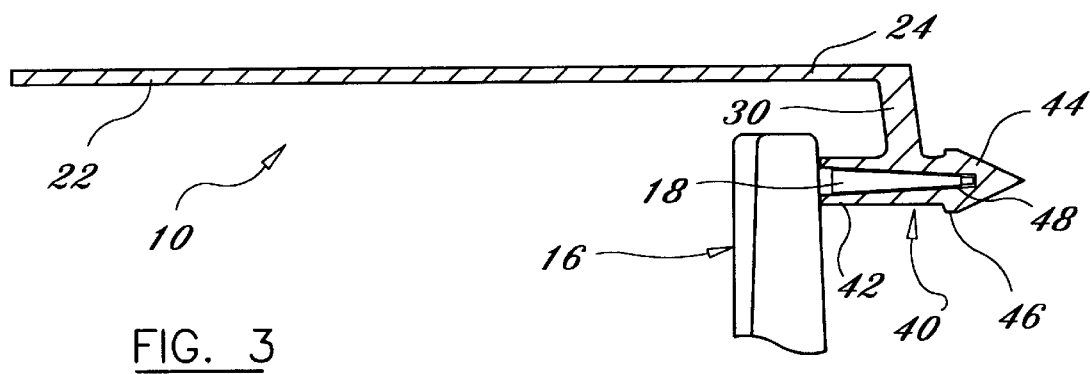
FIG. 3 is a side cutaway view of the present invention showing the bore within the tip member.
Figure 4:
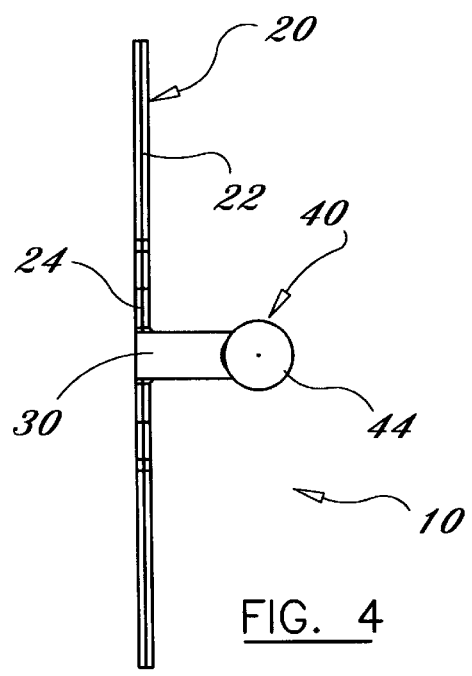
FIG. 4 is a front view of the present invention.

As shown in FIGS. 1 and 2 of the drawings, the tag member 20 preferably includes a broad portion 22 and a narrow portion 24. However, it can be appreciated that the tag member 20 may have any shape as desired by the user. As shown in FIGS. 3 and 4 of the drawings, the tag member 20 is preferably a flat structure. The outer surface of the tag member 20 can be printed upon to identify the animal 12.

As shown in FIGS. 1 through 4 of the drawings, the extended member 30 extends from the narrow portion 24 of the tag member 20. The extended member 30 extends at an angle or orthogonally from the tag member 20 as best shown in FIG. 3 of the drawings. The extended member 30 is preferably constructed of a resilient material.

The tip member 40 is attached to the distal end of the extended member 30 as shown in FIGS. 1 through 4 of the drawings. The extended member 30 is preferably attached to the center portion of the tip member 40 as best shown in FIG. 3 of the drawings. As shown in FIG. 3 of the drawings, the extended member 30 is preferably attached at an angle with respect to the tip member 40 for allowing bending substantially parallel to the tip member 40 during insertion.

The tip member 40 is comprised of a shaft member 42 having an elongate structure as shown in FIG. 3 of the drawings. The shaft member 42 has a spiked end 44 that pierces the ear 14 of the animal 12 when inserted with the applicator. The spiked end 44 includes a flanged portion 46 that is slightly larger in diameter than the shaft member 42 for expanding the pieced hole within the ear 14 of the animal to accommodate both the shaft member 42 and the extended member 30.

The shaft member 42 further includes an open end opposite of the spiked end 44 that exposes a length of a center bore 48 within. The bore 48 removably receives the applicator shaft 18 of the applicator pliers 16 during attachment of the present invention to the ear 14 of the animal 12. The applicator pliers 16 may be hand operated by the user for applying the tip member 40 along with a portion of the extended member 30 through the ear 14 of the animal 12.

Figure 5:
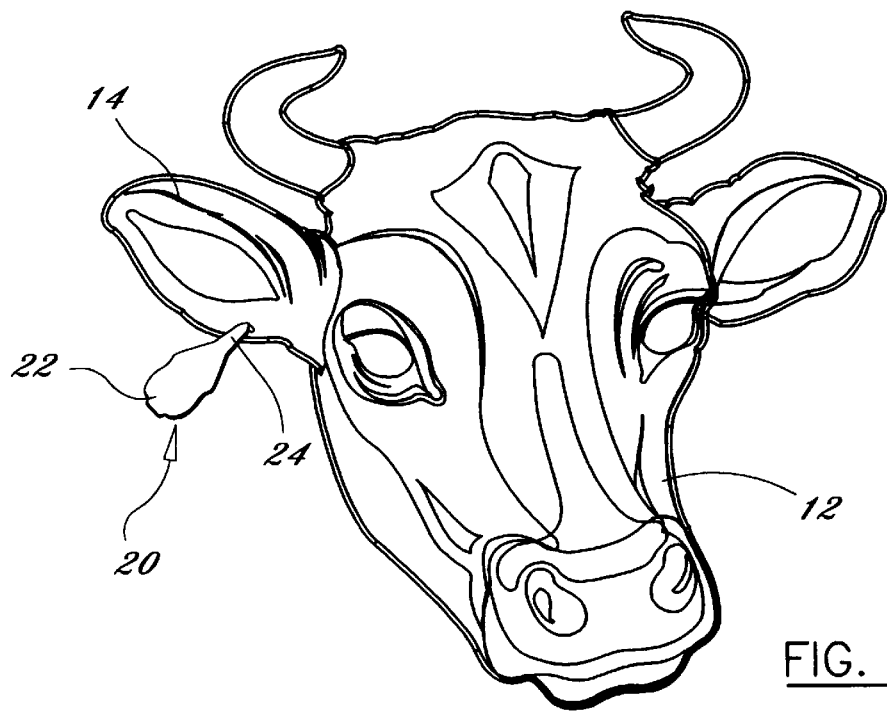
FIG. 5 is an upper perspective view of the present invention attached to an ear of a cow.
Figure 6:
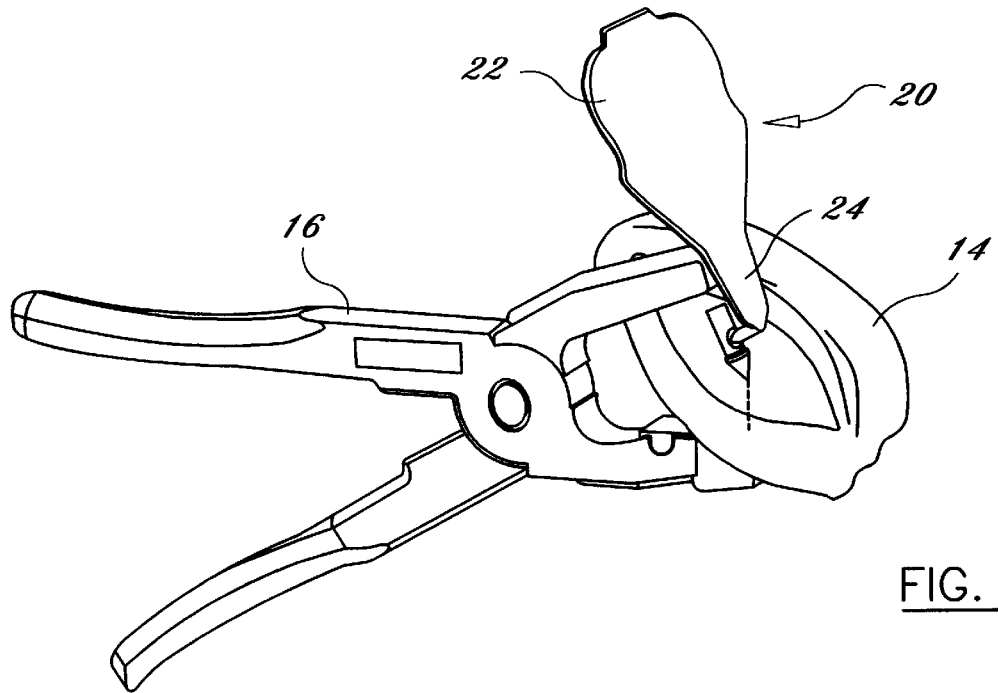
FIG. 6 is an upper perspective view of the present invention being attached to the ear of the cow.

In use, the user positions the tip member 40 upon the applicator shaft 18 of the applicator plies so that the applicator shaft 18 is fully positioned within the bore 48 as shown in FIG. 3 of the drawings. The user then positions the spiked end 44 in the desired position of the ear 14 of the animal 12 as shown in FIG. 6 of the drawings. The user then manually squeezes the applicator pliers 16 thereby forcing the spiked end 44 of the tip member 40 to pierce the ear 14 of the animal 12. As the tip member 40 passes through the pierced ear 14, the extended member 30 engages the ear 14 and is bent rear 14 wardly so as to become substantially parallel to the shaft member 42. The tip member 40 continues to be inserted through the pierced opening until the entire tip member 40 has passed through the pierced opening then the tip member 40 returns to the substantially orthogonal position respective to the extended member 30 thereby preventing removal of the present invention from the ear 14 of the animal 12 as shown in FIG. 5 of the drawings. The pierced hole is substantially enclosed by the extended being positioned tightly within thereby reducing the chance of infection over time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

what is claimed is:

1. An animal tag system, comprising:

a tag member having a front end and a rear end;

an extended member attached to front end of said tag member; and a tip member having an elongate body and a spiked end attached to said body extending away from said rear end, wherein said body is orthogonally attached to said extended member;

a center bore extending longitudinally through said elongate body having a rear opening opposite of said spiked end for receiving an applicator shaft of an applicator pliers.

2. The animal tag system of claim 1, wherein said spiked end includes a flanged portion that is larger than said tip member.

3. The animal tag system of claim 1, wherein said extended member is attached at an angle to said tip member.

4. The animal tag system of claim 1, wherein said tag member is a flat structure.

5. The animal tag system of claim 1, wherein said extended member is constructed from a resilient material.

6. The animal tag system of claim 1, wherein said extended member is attached to a center portion of said tip member behind said flanged portion.

7. The animal tag system of claim 1, wherein said tag member includes a broad portion and a narrow portion.

8. The animal tag system of claim 7, wherein said extended member is attached to said narrow portion of said tag member.

* * * * *